United States Patent [19]

Slonaker

[11] Patent Number: 5,895,861

[45] Date of Patent: Apr. 20, 1999

[54] COMBINATION PRESSURE/TEMPERATURE GAUGE EMPLOYING TWO BOURDON TUBES

[75] Inventor: William H. Slonaker, Baldwin, N.Y.

[73] Assignee: Weiss Instruments, Inc., West Babylon, N.Y.

[21] Appl. No.: 08/974,323

[22] Filed: Nov. 19, 1997

[51] Int. Cl.[6] .................. G01L 7/04; G01K 5/38
[52] U.S. Cl. .................. 73/732; 374/143; 374/203
[58] Field of Search .................. 73/732, 714, 736, 73/737, 741, 743; 374/143, 203

[56] References Cited

U.S. PATENT DOCUMENTS

| | | | |
|---|---|---|---|
| 1,629,063 | 5/1927 | Berry | 374/143 |
| 2,394,987 | 2/1946 | Deming | 73/714 |
| 3,127,771 | 4/1964 | Diehl | 374/143 |
| 3,815,417 | 6/1974 | Smialowicz | 73/708 X |
| 3,905,237 | 9/1975 | Smalarz et al. | |
| 4,682,501 | 7/1987 | Walker | |

*Primary Examiner*—Joseph L. Felber
*Attorney, Agent, or Firm*—Hoffmann & Baron, LLP

[57] ABSTRACT

A gauge for the measurement of both pressure and temperature of a fluid includes a dial plate having pressure and temperature graduations thereon, a first Bourdon tube for measuring pressure and a second Bourdon tube for measuring temperature. The Bourdon tubes are of conventional multiturn spiral construction, each having an open end which communicates with a source of pressure and a closed free end that rotationally responds to changes in pressure within the Bourdon tube. The open ends of the Bourdon tubes are mounted in fixed relation to the dial plate. Attached to the free end of each Bourdon tube is a direct coupled indicating pointer which is rotationally displaceable relative to corresponding graduations on the dial plate. A temperature responsive bulb is connected via a capillary tube to the open end of the second spiral Bourdon tube and forms a closed temperature sensing system therewith.

10 Claims, 4 Drawing Sheets

COMBINATION PRESSURE/TEMPERATURE GAUGE EMPLOYING TWO BOURDON TUBES

BACKGROUND OF THE INVENTION

1. Field of the Invention

The present invention relates generally to pressure and temperature sensing gauge instruments, and, more particularly, to a dual Bourdon tube gauge which measures temperature and pressure in a single gauge housing.

2. Description of the Prior Art

The use of Bourdon tubes to measure variations in pressure is well known in the prior art. Typically, a Bourdon tube is constructed of a flattened tube of spring steel or bronze, bent in a coil form or "C" shape. One end of the Bourdon tube is stationary and has an open inlet, which communicates with the source of pressure, while the other end is sealed and allowed to freely move in proportion to the difference in pressure between the interior and exterior of the tube. As the pressure within the tube increases, the tube tends to straighten, resulting in a greater deflection. The amount of deflection of the free end of the tube is translated, via mechanical or electrical means, into a calibrated output indication of pressure.

It is also known in the prior art to adapt Bourdon tubes for use in temperature measuring instruments. Such temperature gauges generally consist of a closed system employing a hollow cylindrical bulb connected to the Bourdon via a capillary tube. The system is filled with a liquid or gas. The Bourdon tube responds to changes in fill volume (liquid filled system) or changes in pressure (partial liquid filled or gas filled system) related to the changes in temperature at the bulb.

In its simplest form, a typical prior art pressure gauge employs a multiturn spiral Bourdon coil having a pointer mounted directly to its free end. For example, U.S. Pat. No. 3,641,820, to Bissell, discloses an analog pressure gauge employing a Bourdon tube having, at its free end, an integral pointer which moves relative to a calibrated dial plate in response to changes in pressure to which the gauge is exposed. Further typifying analog pressure gauges is U.S. Pat. No. 4,361,046, to Wetterhom, which discloses the use of a mechanical movement or linkage adapted to amplify and transmit the displacement motion of the Bourdon tube to an output indicating pointer. These prior art gauges, however, were capable of measuring only a single parameter.

U.S. Pat. No. 3,905,237(the '237patent), to Smalarz et al., discloses a temperature-compensated pressure gauge. The '237patent employs a first Bourdon tube coupled to a first indicating pointer to display pressure in the conventional fashion and a second Bourdon tube mechanically coupled to a second dial indicator to continuously define an acceptable operating zone over a predetermined temperature range. This gauge, however, is not capable of concurrently displaying both pressure and temperature information.

It is desirable, particularly in boiler gauge applications on hydronic heating systems where it is typically necessary to monitor both water temperature and system pressure, to use a gauge capable of indicating pressure and temperature on a single gauge face. Some prior art gauges have demonstrated the ability to measure both temperature and pressure in a single unit. These gauges, however, generally employ bimetallic temperature sensing elements and C-shaped Bourdon tubes with delicate mechanical gear or linkage arrangements to couple Bourdon tube displacement to an indicating means.

A significant disadvantage of this type of mechanical translation arrangement is that the complexity of fabrication and assembly of the gauge is greatly increased, thereby increasing cost. Additionally, because of the greater number of moving components, reliability is considerably sacrificed. Another disadvantage of using a linkage arrangement is that overall gauge accuracy is diminished as a result of friction introduced by the moving linkage components. Moreover, since the linkage acts to amplify Bourdon tube displacement, there is enhanced sensitivity to vibration and jarring, thereby creating an additional source of error.

Consequently, there is a need to provide a gauge which is capable of simultaneously displaying pressure and temperature information in a single gauge housing that is reliable and is inexpensive to manufacture and repair.

OBJECTS AND SUMMARY OF THE INVENTION

It is an object of the present invention to provide a boiler gauge capable of concurrently measuring and displaying both pressure and temperature on a single gauge face by employing dual spiral Bourdon tubes.

It is another object of the present invention to provide a boiler gauge that does not utilize fragile or complicated mechanical arrangements for coupling the gauge elements to the indicating pointers, thereby reducing the cost of gauge manufacture and repair.

It is yet another object of the present invention to provide a boiler gauge that is reliable and accurate, even in harsh environments.

In accordance with one form of the present invention, there is provided a gauge for concurrently indicating the pressure and temperature of a medium to which the gauge is exposed. The gauge incorporates a first spiral Bourdon tube for measuring pressure and a second spiral Bourdon tube for measuring temperature. The Bourdon tubes are directly coupled to indicating pointers, thus eliminating the need for gears, bearings, or links which are prone to mechanical failure. The Bourdon tubes are enclosed within a common gauge housing that has a visible dial face with fixed markings corresponding to respective pressure and temperature values of the individual Bourdon tubes.

The gauge further may include a rotating bezel having a pointer indicator which may be positioned by the user to indicate a predetermined maximum or minimum pressure or temperature limit. This feature aids the user in quickly visually determining whether a measured pressure or temperature value falls within certain allowable limits.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENTS

Figure 2:
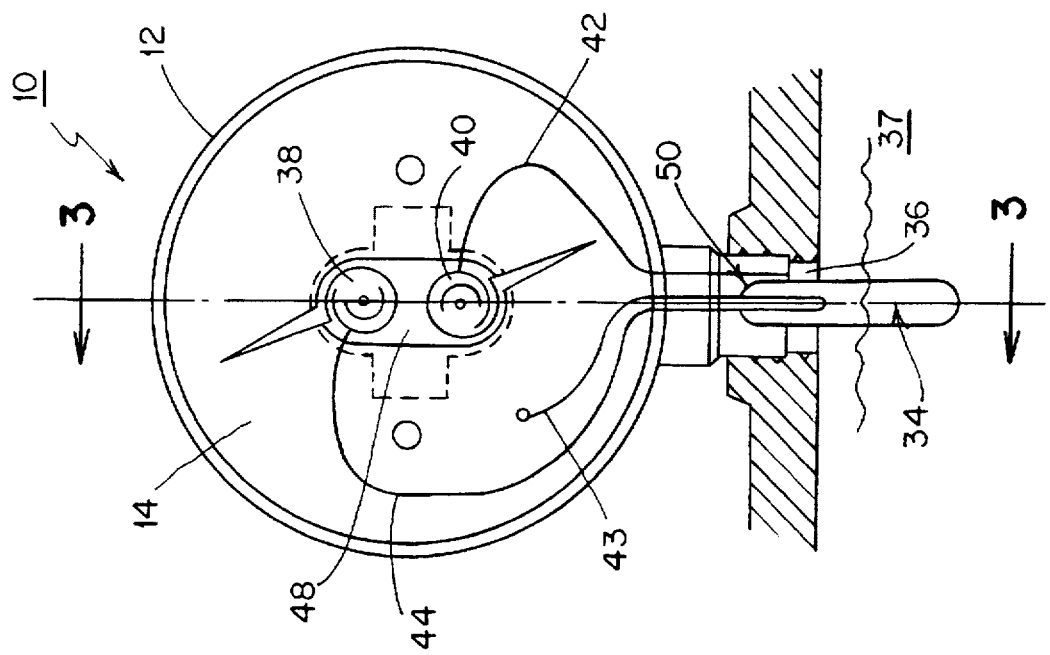
FIG. 2 is a partial sectional view of the front of the gauge shown in FIG. 1 mounted in the wall of a boiler.
Figure 1:
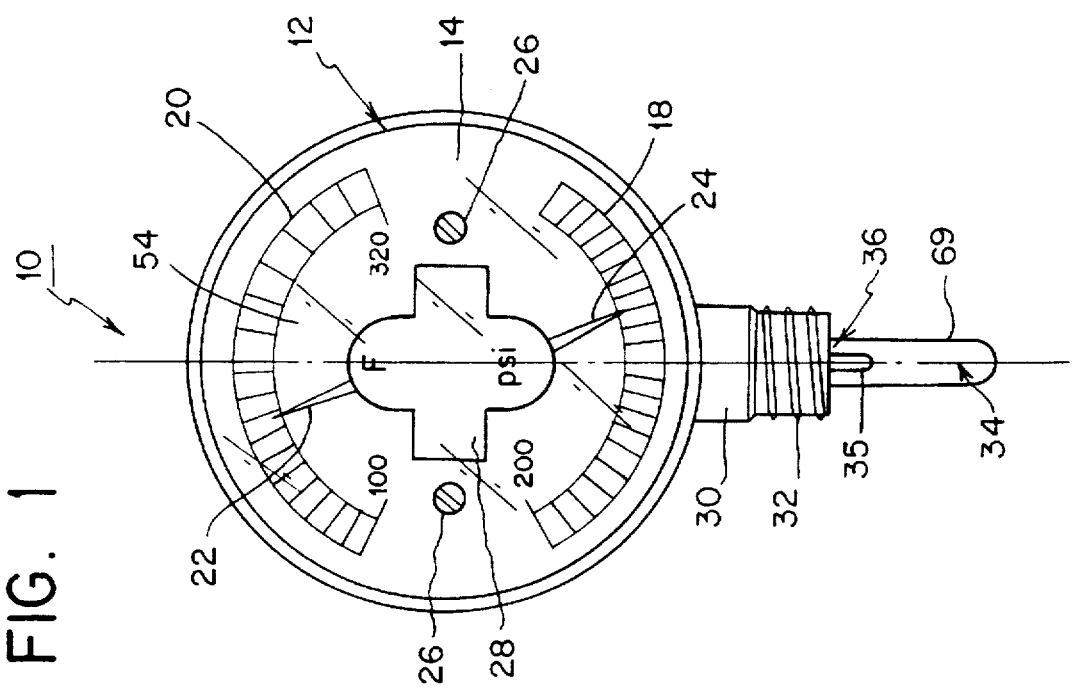
FIG. 1 is a frontal plan view of a gauge formed in accordance with one form of the present invention.
Figure 3:
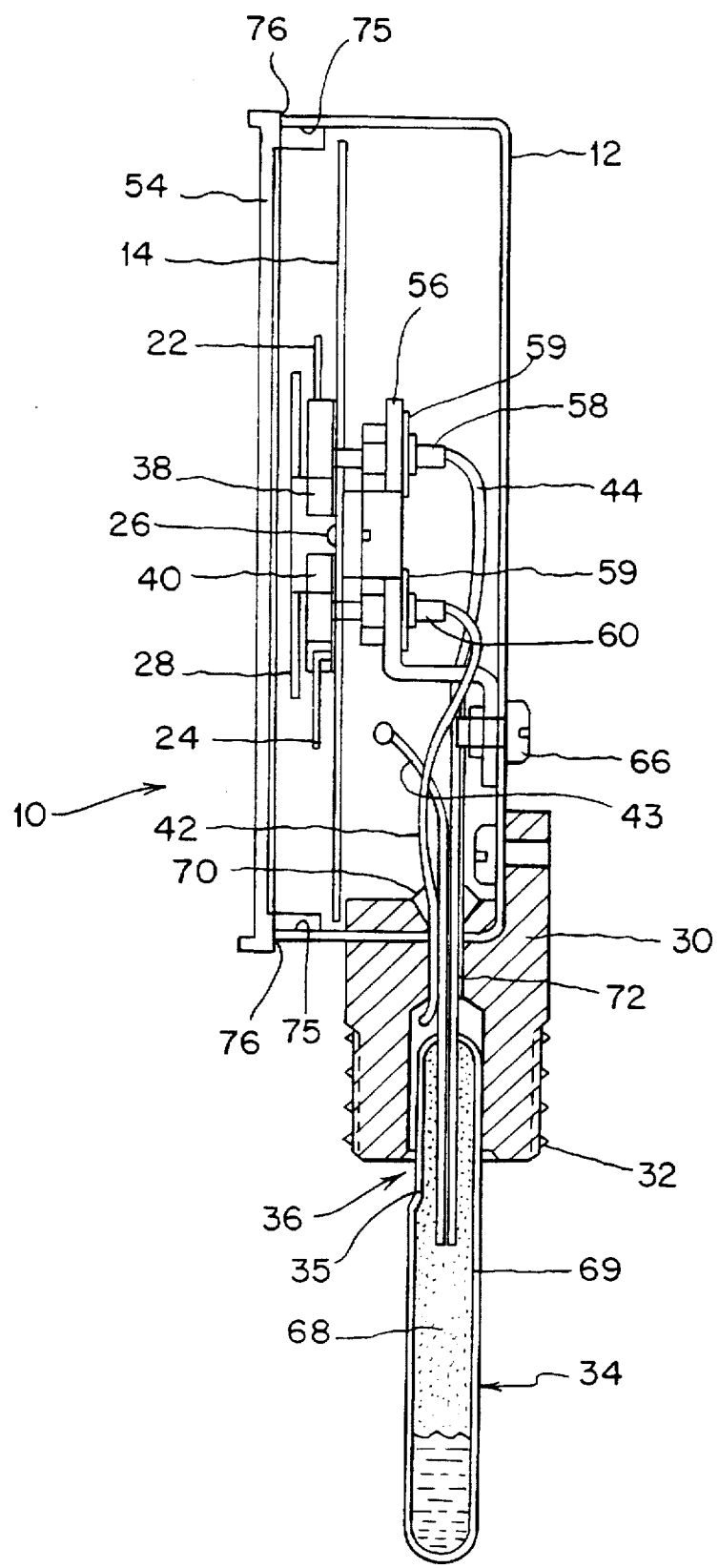
FIG. 3 is a partial cross-sectional view of the gauge shown in FIG. 2, taken along line 3—3 of FIG. 2.

With reference to FIGS. 1-3 of the drawings, a boiler gauge 10 constructed in accordance with the present invention preferably includes pressure and temperature sensing apparatus, a dial plate 14 having a plurality of pressure scale graduations 18 and temperature scale graduations 20 on its face, and a housing 12, closed at its front by a transparent window 54. Attached to the housing 12 is a mounting stem 30, preferably having a threaded end portion 32 or similar means for mounting gauge 10 into an aperture 50 suitably adapted to receive the gauge 10.

The temperature sensing apparatus of gauge 10 basically includes three components: a first Bourdon tube 38 of conventional multiturn spiral construction, as described above, a temperature responsive bulb 34 and a first capillary tube 44. These elements, together, form a sealed system. First capillary tube 44 is affixed between bulb 34 and the inlet end 58 of first Bourdon tube 38 in any suitable manner, such as by soldering. The displacement end of first Bourdon tube 38 supports a temperature indicating pointer 22 which moves relative to temperature graduations 20 on dial plate 14 to indicate a measured temperature value.

The construction of the bulb 34 will now be discussed, with reference to FIG. 3. Bulb 34 preferably comprises a substantially cylindrical casing 69 defining a chamber 68 therein which is sealed at opposite ends. Bulb casing 69 is preferably formed of a metal, such as copper, which has high thermal conductivity and is resistant to corrosion. One end of first capillary tube 44 extends at least partially into bulb chamber 68 of bulb 34, while the opposite end of first capillary tube 44 is connected to first Bourdon tube 38. Preferably, a fill tube 43, extending at least partially into bulb chamber 68, is provided for filling bulb chamber 68 with a fluid fill medium during the manufacture of the gauge. After at least partially filling bulb chamber 68 with the fill medium, fill tube 43 is sealed, such as by soldering, to prevent the fill medium from escaping the bulb 34. After the bulb 34 has been properly filled with fill medium, fill tube 43 serves no further functional use.

Mounting stem 30 is formed with a concentric bore 72 which extends therethrough and which is adapted to receive bulb 34, and through which first capillary tube 44 and fill tube 43 pass. Bulb 34 is secured within mounting stem 30 by any suitable means, and is supported in thermal communication with a fluid 37 (as seen in FIG. 2) to be measured. Any suitable value can be selected for the length of bulb casing 69, but it preferably extends beyond mounting stem 30 such that bulb casing 69 thermally contacts the fluid 37 once gauge 10 is properly seated in aperture 50 (FIG. 2). In the embodiment shown in FIGS. 1-3, bulb casing 69 extends approximately 1½ inches beyond the threaded end 32 of mounting stem 30.

Referring now to FIGS. 1-3, the pressure sensing apparatus of gauge 10 preferably includes a second Bourdon tube 40 of conventional multiturn spiral construction and a second capillary tube 42. The pressure sensing apparatus is similar to the temperature sensing apparatus described above except that it lacks a bulb portion and related components. A first end of second capillary tube 42 is affixed to the inlet end 60 of second Bourdon tube 40 by any suitable means, such as by soldering. A second end of second capillary tube 42, opposite the first end, remains open and communicates with the source of pressure by way of a pressure access opening 36 through concentric bore 72 of mounting stem 30. Second capillary tube 42 is preferably fixedly secured within mounting stem 30 (at location 70; see below) by any suitable means, such as by soldering.

In order to prevent the pressurized fluid 37 from entering the interior of the gauge 10, the end of mounting stem 30 opposite threaded end 32 may be sealed, by soldering or similar means, to form an end cap or plug 70. Capillary tubes 42 and 44, and fill tube 43, are preferably sealed into plug 70, thereby further securing tubes 42, 43 and 44 in place.

Pressure access opening 36, which can be best understood with reference to FIG. 3, may be formed either as a channel or groove in concentric bore 72 of mounting stem 30 or preferably as a depression or channel 35 in bulb casing 69 which extends axially along its length, at least far enough to contact the open end of second capillary tube 42. Regardless of how pressure access opening 36 is formed, the source of pressure to be measured passes through mounting stem 30 via second capillary tube 42 and is presented to second Bourdon tube 40. A pressure indicating pointer 24, attached to the displacement end of second Bourdon tube 40, moves relative to fixed pressure graduations 18 on dial plate 14 to indicate a measured pressure value.

It is important to recognize that pressure graduations 18 and temperature graduations 20 on the face of dial plate 14 are not linearly spaced. Since spiral Bourdon tube deflection is nonlinear in nature and the temperature system fill-medium may have a nonlinear temperature-to-pressure relationship, pressure and temperature graduations 18 and 20 on the face of dial plate 14 are preferably spaced to reflect these nonlinearities.

Figure 5:
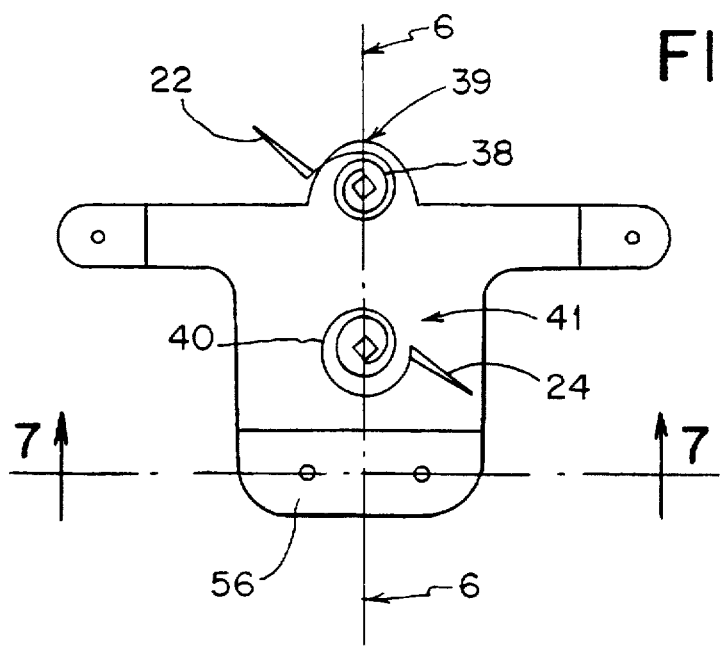
FIG. 5 is a top plan view of the support member and spiral Bourdon tubes of the embodiment shown in FIG. 1.
Figure 6:
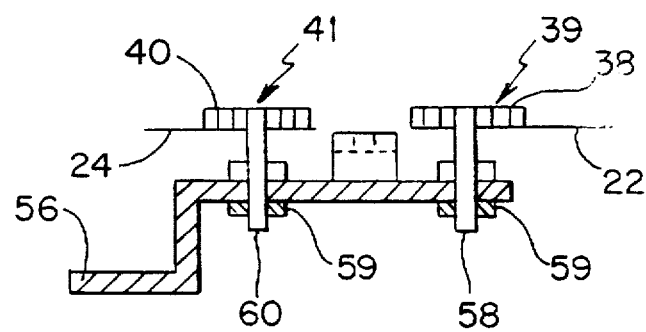
FIG. 6 is a cross-sectional view of the support member shown in FIG. 5, taken along line 6—6 of FIG. 5.
Figure 7:
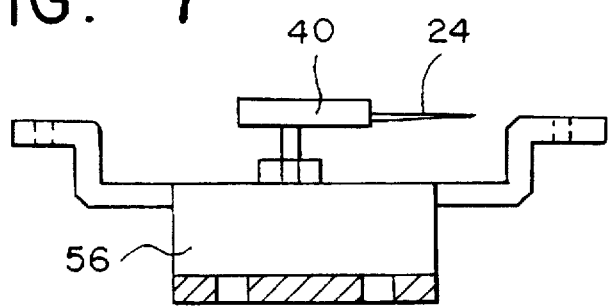
FIG. 7 is a cross-sectional view of the support member shown in FIG. 5, taken along line 7—7 of FIG. 5.

As illustrated in FIGS. 5-7, stationary inlet ends 58 and 60 of Bourdon tubes 38 and 40 are preferably secured to a substantially rigid support member 56. Any suitable size and shape can be selected for support member 56. However, support member 56 is preferably adapted to hold Bourdon tubes 38 and 40 slightly forward of dial plate 14 such that indicating pointers 22 and 24 are provided adequate clearance above the face of dial plate 14. Moreover, Bourdon tubes 38 and 40 are affixed to support member 56 with retaining rings 59, or similar means, in such a way as to allow rotation of each coil/pointer assembly 39 and 41 to provide a coarse adjustment of pointers 24 and 22 to scale graduations 18 and 20 respectively.

As shown in FIG. 2, dial plate 14 preferably includes an aperture 48 through which Bourdon tubes 38 and 40 can pass. This allows Bourdon tubes 38 and 40 to be preassembled to support member 56. It also allows dial plate 14 to be conveniently disassembled and replaced after calibration, if necessary. Alternatively, dial plate 14 may include two circular apertures therein, each sized to accommodate Bourdon tubes 38 and 40 individually.

As illustrated in FIG. 1, a coil cover plate 28 may be used, attached to dial plate 14 by any suitable means, preferably in a snap-fit arrangement. Coil cover plate 28 is adapted to hide Bourdon tubes 38 and 40 from view without interfering with the movement of indicating pointers 22 and 24. In addition to providing aesthetic enhancement to the gauge, coil cover plate 28 affords protection to the Bourdon tubes 38 and 40, particularly if no protective window 54 is utilized. Consequently, coil cover plate 28, if used, is preferably formed of a material, such as aluminum, which offers suitable structural rigidity. Moreover, the gauge manufacturer's name or logo, and/or other useful information, such as units of measurement, may be conveniently printed on coil cover plate 28.

Referring to FIG. 3, a preferred arrangement for securing dial plate 14 and Bourdon tubes 38 and 40 within gauge housing 12 is illustrated. Support member 56 may be attached to housing 12 in any suitable fashion, such as with screws 66, rivets, or weld. Support member 56 preferably allows fixed inlet ends 60 and 58 of Bourdon tubes 38 and 40 to be elevated from housing 12, thereby providing adequate clearance for the attachment of capillary tubes 42 and 44. Furthermore, support member 56 may be fixedly attached to dial plate 14 in any suitable manner, such as by screws 26, rivets, or weld.

An alternative arrangement (not shown) for securing dial plate 14 to housing 12 is to provide an annular rim along the inside surface of housing 12 upon which dial plate 14 is supported. Furthermore, transparent window 54 may include laterally extending protrusions or fingers to contact the face of dial plate 14 once window 54 is properly seated within housing 12. If this arrangement is used, however, dial plate 14 should be interlocked or "keyed" with the housing 12 in order to prevent dial plate 14 from rotationally shifting in relation to indicating pointers 22 and 24. Such misalignment of graduations 20 and 18 with respect to indicating pointers 22 and 24 could result in erroneous temperature and pressure measurements.

Any suitable size and shape may be selected for housing 12, if used. In the embodiment of FIGS. 1–3, housing 12 is preferably shaped as a cup, having a bottom wall and a cylindrical upstanding sidewall. The upper edge of the side wall defines an open rim 76 which is outwardly flanged and adapted to receive transparent window 54. Mounting stem 30 is attached through the sidewall of housing 12 and extends radially therefrom. Lower, side or top orientations of the mounting stem 30 are contemplated. Alternatively, housing 12 may be cast or molded of any suitable material, such as brass, aluminum or plastic, and mounting stem 30 may be molded integrally with housing 12.

Figure 4:
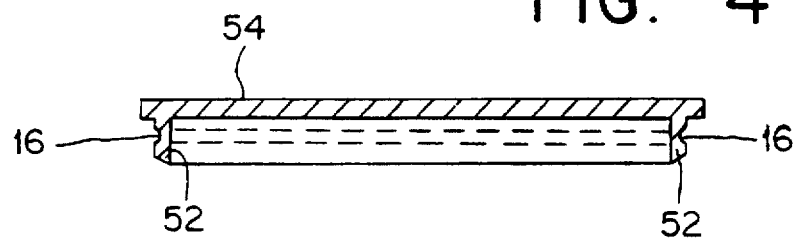
FIG. 4 is a cross-sectional view detailing the transparent window of the gauge shown in FIG. 3.

The transparent window 54 of gauge 10 is preferably secured within housing 12 in a pressure-fit arrangement that may best be understood by referring to FIG. 4. As illustrated in FIG. 4, window 54 preferably includes a cylindrical sidewall 52 that extends laterally downward from the top surface of window 54. The housing 12 may have features or projections 75 inside its open rim 76 which preferably engage a groove 16 in window sidewall 52 to lock and secure window 54 in place.

Figure 8:
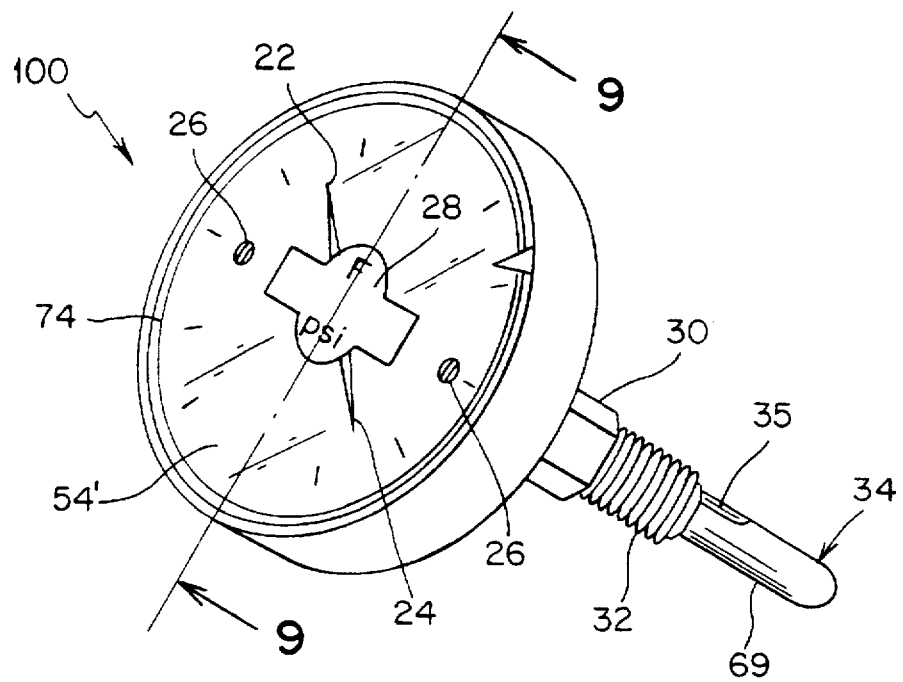
FIG. 8 is a perspective view of the front of a second embodiment of a gauge formed in accordance with the present invention.
Figure 9:
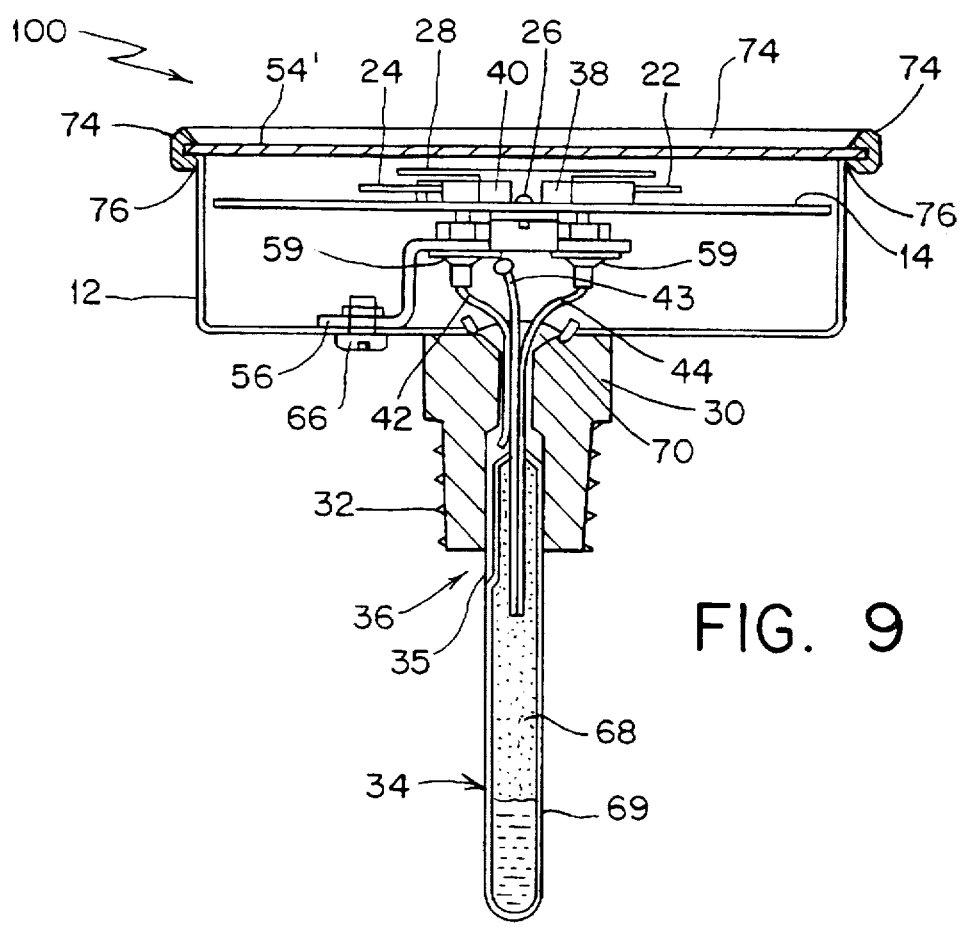
FIG. 9 is a partial cross-sectional view of the gauge shown in FIG. 8, taken along line 9—9 of FIG. 8.

Another embodiment of the boiler gauge of the present invention is shown in FIGS. 8 and 9, designated generally as 100. Referring to FIGS. 8 and 9, this embodiment is primarily the same as the embodiment described above and shown in FIGS. 1–3. The principal difference is that mounting stem 30 is attached through the back wall of housing 12 and extends axially therefrom, rather than radially attached through the sidewall of housing 12. This configuration may be preferred in certain applications requiring a back-mounted boiler gauge.

Another difference between the gauge embodiment shown in FIGS. 8 and 9 is the method of attaching the transparent window to the housing. Rather than attaching the window in a pressure-fit arrangement, as described above, window 54' of gauge 100 may be held in place by a circular edge flange or bezel 74. Bezel 74 is adapted to secure window 54' against the flanged rim 76 of housing 12. Moreover, bezel 74 preferably includes a pointer 78 or similar indicating member, located along its rim, that is capable of being rotationally positioned to mark a predetermined pressure or temperature limit. The pointer 78 may thereby aid in quickly establishing whether a measured pressure or temperature value is within certain allowable limits. The method of attaching the transparent window, however, is not limited to any particular gauge embodiment.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A gauge for the measurement of both pressure and temperature of a fluid, the gauge comprising:

a dial plate having graduated markings thereon corresponding to pressure and temperature values;

a first spiral Bourdon tube for measuring pressure, the first Bourdon tube having an open inlet end in communication with the fluid to be measured and fixedly mounted in relation to the dial plate, and a closed free end rotationally displaceable with respect to the dial plate;

a first indicating member connected to the free end of the first Bourdon tube for visually displaying changes in pressure relative to the graduated markings on the dial plate;

a second spiral Bourdon tube for measuring temperature, the second Bourdon tube having an open inlet end fixedly mounted in relation to the dial plate, and a closed free end rotationally displaceable with respect to the dial plate;

a second indicating member connected to the free end of the second Bourdon tube for visually displaying changes in temperature relative to the graduated markings on the dial plate;

a bulb containing a fluid having a known pressure/temperature relationship, the bulb being in thermal communication with the fluid to be measured; and a capillary tube connecting the bulb to the open inlet end of the second Bourdon tube, wherein the bulb, capillary tube and second Bourdon tube form a closed temperature responsive system.

2. A gauge according to claim 1, further including:

a substantially rigid housing having a bottom wall and a sidewall extending from the bottom wall, the sidewall including an upper portion defining an open rim, the housing at least partially enclosing the dial plate and first and second Bourdon tubes; and a mounting stem extending through the housing, the mounting stem supporting the bulb and communicating with the fluid to be measured.

3. A gauge according to claim 2, wherein the mounting stem extends radially outward from the sidewall of the housing.

4. A gauge according to claim 2, wherein the mounting stem extends axially downward from the bottom wall of the housing.

5. A gauge according to claim 2, wherein the gauge further includes a transparent window, the window adapted to engage the open rim of the housing in a pressure-fit relation therewith.

6. A gauge according to claim 5, wherein the transparent window is retained against the open rim of the housing by a bezel, the bezel rotatably attached to the open rim of the housing, the bezel having at least one indicating pointer thereon for marking a predetermined pressure or temperature value.

7. A gauge according to claim 2, wherein the stem includes a threaded end for mounting the gauge in fixed communication with the fluid to be measured.

8. A gauge according to claim 1, wherein the bulb is rigid and substantially cylindrical in shape.

9. A gauge according to claim 1, wherein the gauge further includes a substantially rigid support member for securing the Bourdon tubes in fixed relation to the dial plate.

10. A gauge according to claim 1, wherein the first and second indicating members are integrally formed from the free end of the Bourdon tubes.

* * * * *